March 4, 1941.  A. G. B. METCALF  2,233,483
SUPERVISING FILAMENTARY MATERIAL
Filed July 28, 1938  3 Sheets-Sheet 1

Inventor:
Arthur G. B. Metcalf
by Roberts, Cushman & Woodberry
his Attys.

March 4, 1941. A. G. B. METCALF 2,233,483
SUPERVISING FILAMENTARY MATERIAL
Filed July 28, 1938 3 Sheets-Sheet 2
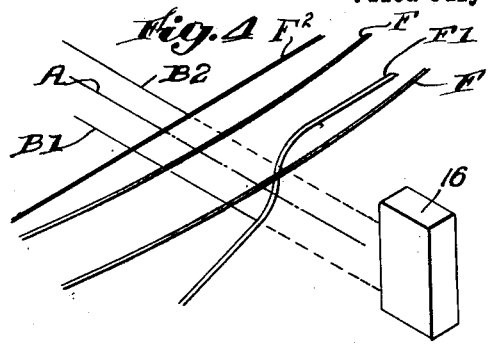
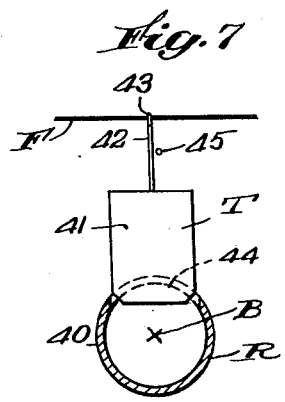
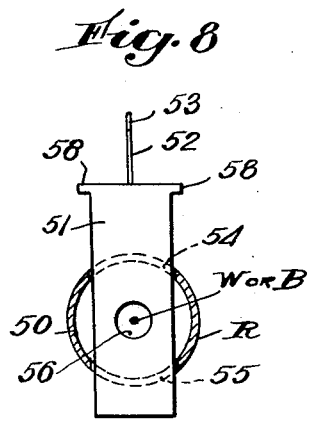
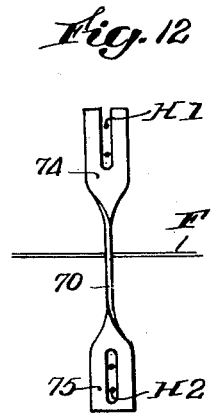
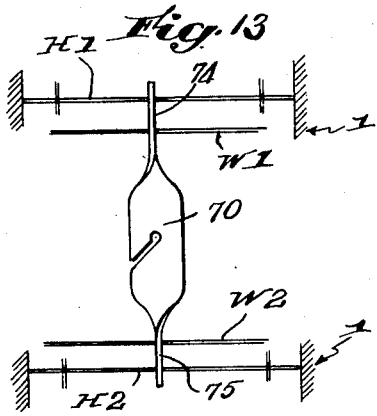
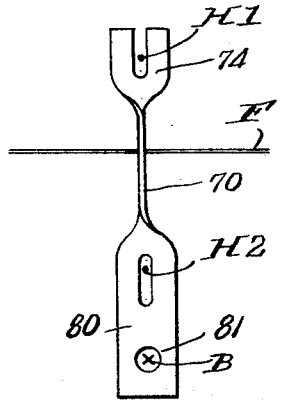
Inventor
Arthur G. B. Metcalf
by Roberts, Cushman & Woodberry
his Attys.

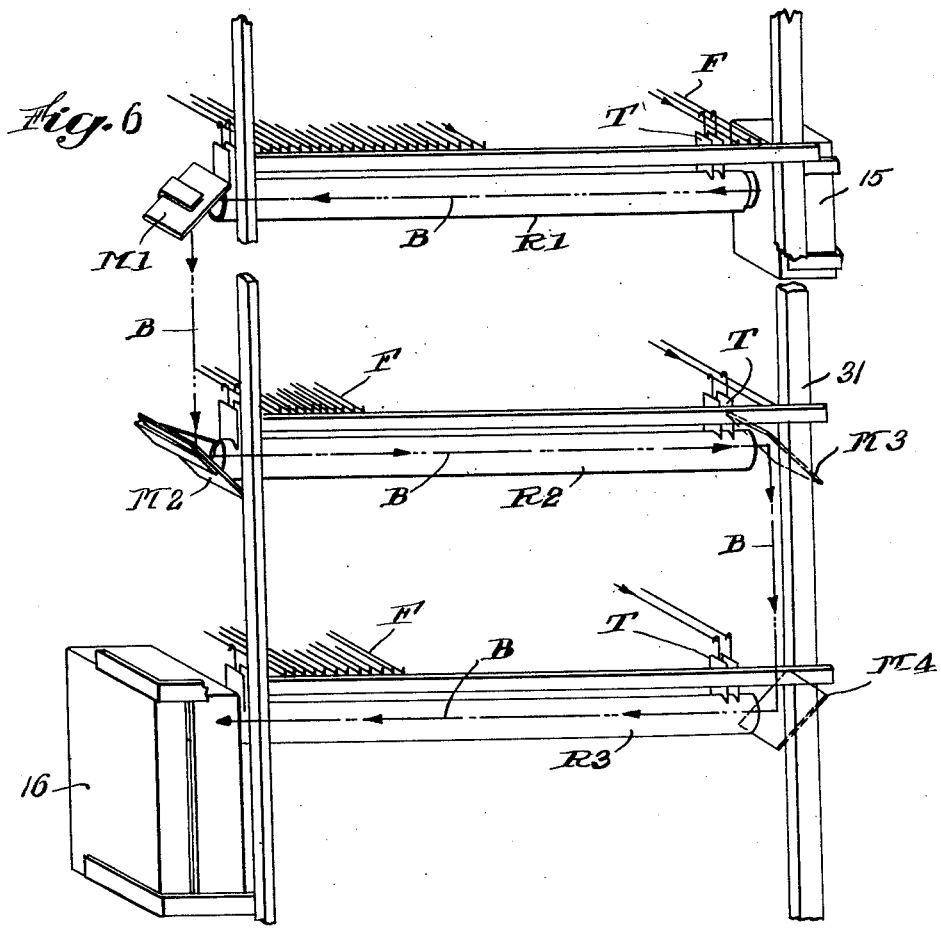
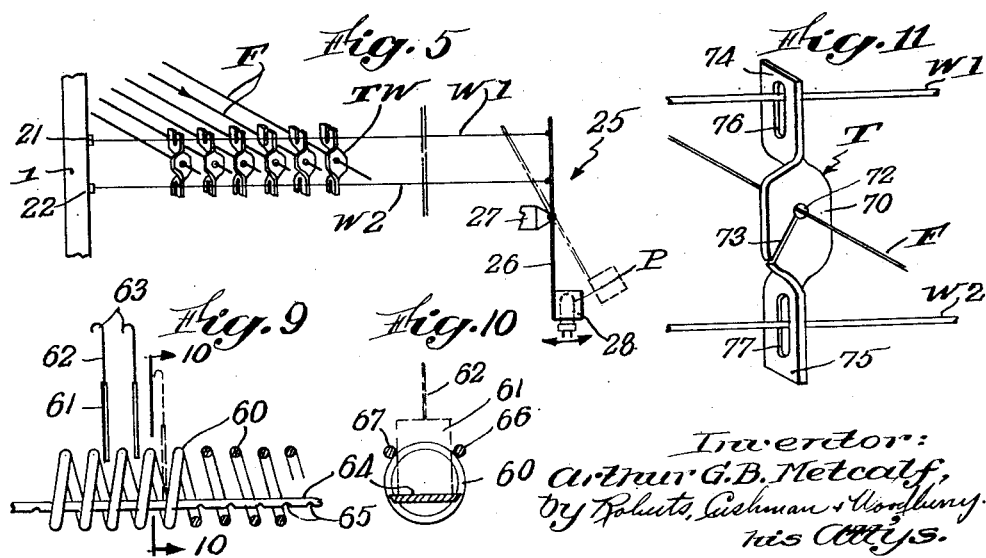

Patented Mar. 4, 1941

2,233,483

UNITED STATES PATENT OFFICE 2,233,483

SUPERVISING FILAMENTARY MATERIAL

Arthur G. B. Metcalf, Milton, Mass., assignor to Photoswitch Incorporated, Cambridge, Mass., a corporation of Massachusetts Application July 28, 1938, Serial No. 221,804

9 Claims. (Cl. 250—41.5)

The present invention deals with devices for supervising the condition of moving filamentary material, as for example stop motions or signaling apparatus for textile machinery.

It is known to provide progressing filaments, as for example the threads of warping frames or creels with so-called drop wires which stop the machine or give a signal by completing an electric alarm circuit. Such arrangements are, however, rather complicated, uncertain in operation, and not applicable in those frequently occurring situations where only extremely small forces are available.

It is the principal object of the present invention to provide a device responding in positive, sensitive and reliable manner to abnormal conditioning of running filaments, avoiding complicated mechanism, and not mechanically or electrically connected with responsive instrumentalities. In one aspect of the invention, I utilize the running thread, or targets suspended on the threads to be supervised for interrupting a light ray which in its turn operates a photoelectric relay. In another aspect, my invention contemplates the association of a series of moving filaments with a supervisory light ray adjacent to a generatrix of the surface formed by the filaments, any filament deviating from the surface effecting either directly or through a rider a change in the intensity of the light ray, or a change in the position of a similarly located supervisory wire in its turn affecting a light ray.

Other features of my invention are tubular or helical target guides, which at the same time protect the light beam or the detector thread against interference, an arrangement for utilizing a single light ray for several series of filaments, and forms of riders or targets especially suited for the purpose of my invention.

These and other objects, aspects and features of my invention will be apparent from the following explanation of several concrete embodiments thereof, by way of example for the genus of the invention. The description refers to drawings in which:

Figs. 4 and 5 are diagrams showing arrangements with supervisory elements above and below the filaments;

Fig. 6 is an isometric view of a creel equipped with a device according to my invention;

Figs. 7 and 8 are cross sections through target guides, on lines 7—8 of Fig. 2;

Fig. 9 is a detail view of a helical target guide;

Fig. 10 is a section on line 10—10 of Fig. 9;

Fig. 11 shows in detail a target used in accordance with Fig. 5;

Figs. 12 and 13 are side and front views, respectively, of targets similar to Fig. 11 but with guide wires; and Fig. 14 shows a target similar to Fig. 11 but directly affecting a light beam.

The following description refers to textile machinery and particularly to beam warping equipment, but it will be understood that my invention applies to any situation requiring the supervision of the movement of filamentary elements; the material, size and shape of such elements being of secondary importance as far as the principle of the invention is concerned.

Figure 1:
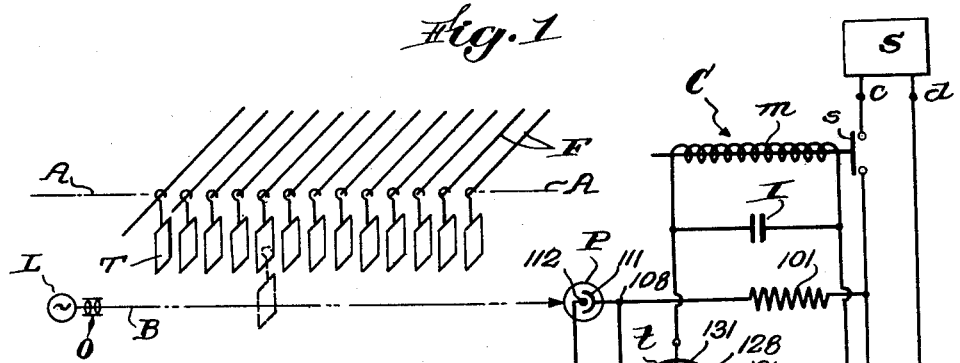
Fig. 1 is a diagrammatical representation of a control device according to my invention, including a photoelectric relay circuit.

Referring to Fig. 1, filaments F, in this instance the threads to be wound on a beam warper, are guided through an axis A in the surface which these threads define. The usual warper serves this purpose by providing, mounted on a frame 1 (Figs. 2 and 3), a roll 2 for guiding the yarn coming for example from a creel as shown in Fig. 6 to a comb 4, from where it is wound on beam 5. Suspended on the threads are target elements T, to be described in detail hereinafter, which extend into the guide slots 11 of a tubular retainer R, likewise later to be described more in detail. A lamp L (Fig. 1) if desired having suitable optical means O for forming a collimated beam B is arranged for example in housing 15 (Fig. 3), beam B being directed, within tube R, to strike photocell P of a photoelectric relay circuit C, preferably contained in housing 16.

A photoelectric relay circuit C suitable for this purpose is described in Patent No. 2,154,480, dated April 18, 1939. In this circuit, $t$ is an electronic amplifier with cathode 104, anode 131, control electrode 106, screen electrode 121 and suppressor electrode 128. As indicated, cathode 111 of photocell P is connected directly to grid 106, and over impedance 101 to terminal $a$ of an alternating current source. Anode 112 of cell P, cathode 104 of the amplifier tube and screen grid 121 are connected to taps or sliders 114, 103 and 122, respectively, of impedance 107. The plate circuit contains a relay magnet $m$ actuating a switch $s$ which controls a current responsive organ S connected at $c$ and $d$, for example a stopping or signaling device. A condenser I is preferably connected in parallel to magnet m. As at length described in the above-identified patent, a change in the illumination of photocell P will cause closing or opening of switch s and hence actuation of S.

If one of threads F breaks, the respective target T will fall into tube R, interrupt beam B and actuate signaling or stopping device S.

In certain instances, especially if the filaments to be supervised are comparatively thick, it is possible to omit the targets. As diagrammatically shown in Fig. 4, the threads F are guided in such a manner that they pass, under normal conditions, through axis A. In this instance, it is assumed that the threads are normally sagging to a certain extent, as is often the case under practical conditions. Two light beams B1 and B2 are directed toward photoelectric relay 16. If a filament F1 breaks and its ends fall, or if a filament F2 is tensioned and rises, these filaments interrupt beams B1 or B2, respectively, thereby stopping the machine or causing a signal to be given.

Instead of obstructing the light directly or by means of an intermediate link, namely targets T, a further intermediate link may be used, according to one aspect of my invention. Instead of running supervisory light beams B1 and B2 (Fig. 4) along the axis A of the surface defined by the filaments, one or two supervisory feeler wires or threads are similarly run along axis A, as shown in Fig. 5. Wires W1 and W2 of Fig. 5 are at 21, 22 attached to frame 1, and the threads F are preferably provided with riders TW held in close proximity to these wires, in a manner presently to be described in detail. On the other side, feeler wires W1, W2 lead to a target device 25, consisting for example of a double-armed lever 26 pivoted at 27. To one arm wires W1 and W2 are attached, whereas the other arm has a flag or target 28 normally interposed between a light source and photoelectric element P. If one of threads F descends or rises, a wire W1 or W2 is deflected, lever 26 is rotated and light admitted to P, operating device S. It will be noted that the last-mentioned arrangement permits operation with a normally de-energized relay circuit, whereas the arrangement according to Figs. 1 to 4 operates with normally illuminated photoelectric element.

It is sometimes practical to omit riders TW from the filaments of Fig. 5, the abnormally conditioned filaments directly operating supervisory wires W1 or W2. Such an arrangement also results from replacing beams B1 and B2 of Fig. 4 by wires W1, W2.

In many instances, the filaments to be supervised are running in several planes or surfaces, and the machine is to be stopped, or a signal given, upon abnormal movement of any one of the filaments. In that case, I prefer an arrangement according to Fig. 6. In that figure, 31 is the frame for example of a creel supplying a beam warper according to Figs. 2 and 3, the creel packages being arranged as usual and supplying the threads F running in the direction of the arrows. A light source in housing 15 projects a beam B through retainers, similarly as described with reference to Fig. 2. Reflectors M deflect the beam several times so that it is directed through each one of retainer tubes R1, R2, R3, targets T detecting abnormal thread movements by interrupting the beam and actuating the photoelectric relay in box 16 in a manner which now will be evident.

Figure 3:
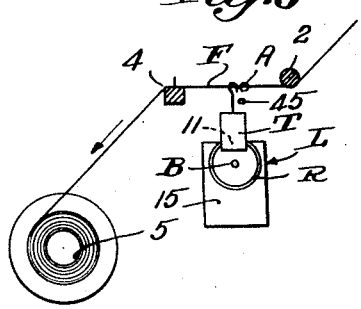
Fig. 3 is a section on line 3—3 of Fig. 2.
Figure 2:
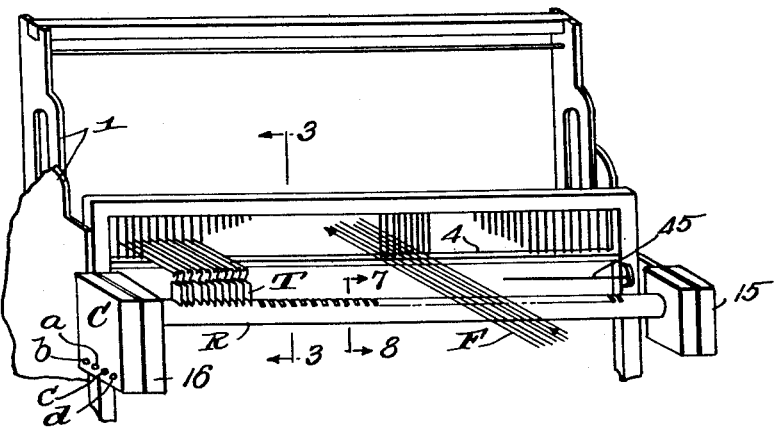
Fig. 2 is an isometric view of a beam warper fitted with control apparatus according to my invention.

Fig. 7 shows the type of target T used in arrangements according to Figs. 1, 2 and 3. A blade 41 of very thin sheet material, as aluminum or copper, has a shank 42 with hook 43 hanging on thread F. The retainer R is a tube 40 with cuts 44 into which blade 41 partly extends. A wire 45, stretched between the sides of frame 1 (Fig. 2) may be provided for counteracting any tendency of the target to move along with thread F. The axis of the light beam is indicated at B. It will now be evident that, when the filament sags or breaks, blade 41 will fall into the tube and interrupt the light beam, actuating device S. Upon knotting the thread, the target can be easily picked up from the tube and again hooked on.

Fig. 8 shows another form of target and retainer. In this instance tube 50, forming the retainer, has two series of cuts 54 and 55. Blade 51 extends through both slots and has a central opening 56 for a supervisory light beam or thread. Hook 53 may be made so wide that it can not pass through slot 54, retaining the target in case of thread breakage. Instead, a tray may be provided below the retainer for the purpose of catching riders, or the blade may have shoulders 58.

Instead of projecting beam B through retainer tube R, a supervisory wire may be used instead, as mentioned above with reference to Fig. 8. Such a wire is connected to a target device as for example shown at 25 of Fig. 5.

Instead of using a tube for the purpose of guiding and holding the targets or riders, retainer R may be made from a helical spring, as shown in Figs. 9 and 10. In these figures, 61 is the target blade with shank 62 and hook 63. Helix 60 is made, or stretched, to a pitch corresponding to the spacing of the targets, which are guided within the respective windings of the helix. In order to space and to stiffen the helix, preventing it from sagging, a strip 64 with notches 65 may be welded or brazed thereto, this strip at the same time preventing the targets from falling through. In addition, especially if the retainer is of considerable length, wires 66, 67 (Fig. 10) may be welded to the helix.

For use with the embodiment according to Fig. 5, I prefer to use riders of the form indicated in Fig. 11. In this figure, 70 is the rider blade having a perforation 72 for filament F and a slot 73 for threading the latter. At each end, the strip from which the target is made is twisted 90° to form two wings 74 and 75 with slots 76, 77 for feeler wires W1 and W2, respectively. Instead of using closed slots, 76, 77, open recesses can be used as shown in Fig. 5, or one open and one closed slot. It is evident that any abnormal movement of the filament F will cause displacement of one or both feeler wires, and that the rider will be prevented from moving with filament F, and from dropping if closed slots 76, 77 are used.

If it should be desirable to relieve the feeler wires W1, W2 from any force acting in the direction of the filament travel, separate holding wires H1, H2 may be provided, as shown in Figs. 12 and 13.

A similar type of target, as shown in Fig. 14, may be used for directly controlling a supervisory light beam. This target is similar to the one of Figs. 12 and 13 but has only holding wires H1, H2 and an extended wing 80 having a window 81 for light beam B similar to opening 56 of Fig. 8.

The operation of the device according to my invention has been indicated above when describing the embodiments preferred by me at the present time; it will therefore be sufficient shortly to recapitulate the operation as follows.

Each of the yarns, wires, ropes or other filamentary elements progressing in a device handling such elements is guided to pass through a line juxtaposed to a detecting element, either a light beam (Fig. 1) or feeler wire affecting a light beam (Fig. 5). In most cases, each filament is provided with a target riding thereon as above described, but in certain instances targets will not be necessary, compare Fig. 4. The light beam B will remain normally conditioned so long as the filaments progress normally; as soon as a filament breaks, or becomes unduly taut, light beam B is interrupted, or its intensity changed by the filament F, or its target T, or by mask 28 actuated by a feeler wire, as these elements are deviated by the abnormally conditioned filament.

It should be understood that the present disclosure is for the purpose of illustration only and that this invention includes all modifications and equivalents which fall within the scope of the appended claims.

I claim:

1. A supervisor for thread-like material comprising means for guiding a series of filaments through a straight line of a surface, feeler means arranged along said line and responsive to deflection of any one of said filaments from said line by deviating, without substantially stressing said filaments while in normal position, a photoelectric relay including a light-sensitive element and a light source sending a beam toward said element, and light-obstructing target means between said source and said element and controlled by said feeler means for actuating said relay through movement of said target means relatively to said beam upon said deflection of a filament.

2. A supervisor for thread-like material comprising means for guiding a plurality of filaments along a substantially horizontal plane, means for projecting a light beam substantially parallel to said plane, a light-sensitive element in the path of said beam, and on each filament, respectively, a light-obstructing target ridable on and gravitationally contacting said filament for interrupting said beam upon movement of any one filament from said plane.

3. A supervisor for thread-like material comprising means for guiding a series of filaments along a surface, means for projecting a light beam substantially parallel to a line of said surface, a light-sensitive element in the path of said beam, a light-obstructing target on each filament said targets being arranged along said line for interrupting said beam upon movement of said filament from said surface, and elongate guide means for said targets extending along said beam and restraining said targets to move substantially only transverse of said surface.

4. A supervisor for thread-like material comprising means for guiding a series of filaments along a surface, a thread-like feeler element parallel to a line of said surface juxtaposed to said filaments for deflection upon movement of any one filament from said line, a photoelectric relay including a light-sensitive element and a light source sending a beam toward said element, and a light-obstructing target moved by said feeler element upon said deflection between said source and said element thereby actuating said relay.

5. A supervisor for thread-like material comprising means for guiding a series of filaments through a straight line of a surface, means for projecting a light beam substantially parallel to said line, a light-sensitive element in the path of said beam, on each filament a light-obstructing target ridable on and contacting its filament for interrupting said beam upon movement of said filament from said surface, and a tube-like element parallel to said line and having recesses in planes intersecting said line, said recesses engaging said targets for guiding them transverse of said surface.

6. A supervisor for thread-like material comprising means for guiding in two surfaces two series of filaments through straight lines of said surfaces, means for projecting a light beam, optical means for conducting said beam in two portions substantially parallel to said lines, a light-sensitive element in the path of said beam, and along said lines light-obstructing targets ridable on and contacting said filaments for interrupting said beam upon movement of any one of said filaments from said surfaces.

7. A supervisor for thread-like material comprising means for guiding a series of filaments substantially horizontally along a surface, means for projecting a light beam crosswise of said surface, a light-sensitive element in the path of said beam, and on each filament, respectively, a light-obstructing target ridable on and gravitationally contacting said filament for interrupting said beam upon movement of any one filament from said surface.

8. A supervisor for thread-like material comprising means for guiding a series of filaments along a surface, means for projecting a light beam substantially crosswise of said surface, a light-sensitive element in the path of said beam, a light-obstructing target on each filament, said targets being arranged along a line parallel to said beam for interrupting said beam upon movement of said filament from said surface, and elongate guide means for said targets extending along said beam and restraining said targets to move substantially only transverse of said surface.

9. A supervisor for thread-like material comprising means for guiding a series of filaments along a surface, a rider on each filament, elongate guide means restraining said riders to move substantially only transverse of said surface, a thread-like feeler element substantially parallel to said guide means and juxtaposed to said riders for deflection upon movement of any one filament from said surface, a photoelectric relay including a light-sensitive element and a light source sending a beam toward said element, and a light-obstructing target moved by said feeler element upon said deflection between said source and said element thereby actuating said relay.

ARTHUR G. B. METCALF.